Dec. 7, 1937.  F. R. WOODBURY  2,101,568
SOUND DEADENING CONSTRUCTION
Filed June 4, 1934
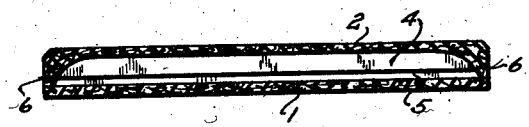
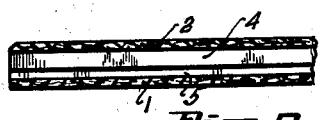
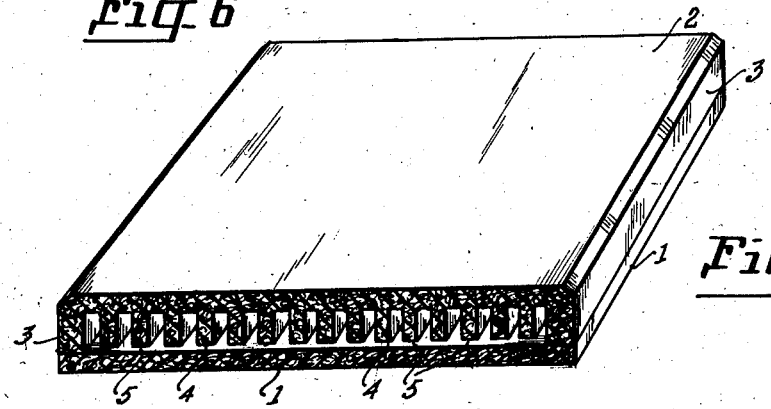
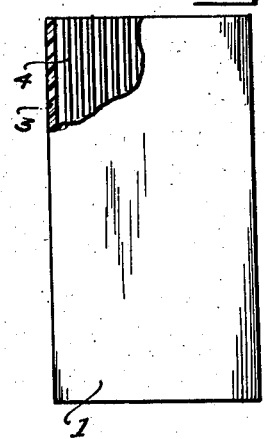
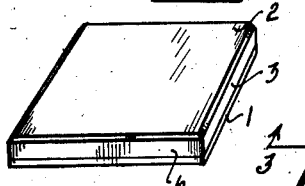
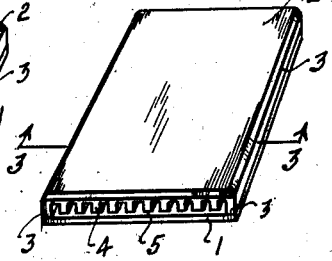
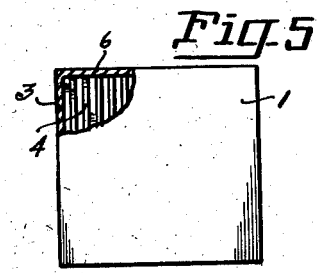
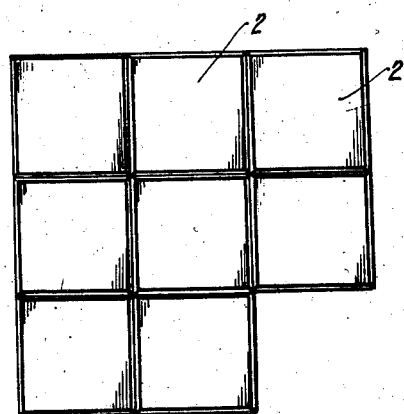
Inventor
Francis R. Woodbury
Attorney
Clive Hartson Patented Dec. 7, 1937

2,101,568

UNITED STATES PATENT OFFICE 2,101,568

SOUND DEADENING CONSTRUCTION

Francis R. Woodbury, Portland, Oreg.

Application June 4, 1934, Serial No. 728,858

4 Claims. (Cl. 154—44)

My invention relates to sound deadening and absorbent construction for the treatment of rooms, halls, studios, auditoriums and the like for the purpose of reducing or substantially eliminating sound reverberation, reflection, echoing or focusing.

One of the greatest problems presented to acoustical engineering has been and is the provision of an acoustical member that will absorb or reduce sound of both high and low frequencies. It has been found that a resilient substance provides quite satisfactory results for reducing sounds below 1024 frequencies, while a porous, fibrous substance has been found equally satisfactory for reducing sound above the foregoing frequencies. The use of either a resilient substance or a fibrous porous substance alone has been productive of increased resonance and reverberation in the high or low frequencies, as the case may be, which has more than offset the good results achieved thereby. In order to overcome these unsatisfactory results, it is common practice to combine the two substances in acoustical treatments; that is to say, both a resilient substance and a porous substance are used for this purpose. In this event the high frequency absorbent substance may be in the form of a backing or supporting member to be applied to the walls or ceilings receiving treatment, over which is applied a substance (through which high frequencies may easily penetrate to the absorbent backing) having resilient characteristics suitable for reducing the low frequencies.

While the foregoing construction has been productive of better results than has been experienced in the utilization of either substance separately, it has not proven entirely satisfactory. There has been a pronounced variation in the degree of absorption between high and low frequencies. From a constructional point of view it has been found difficult and expensive to apply.

My invention departs from the foregoing practice in that I utilize but one substance for the absorption or reduction of sound of both high and low frequencies. While I do not care to confine my invention to any particular type of sound absorbent material for this purpose, for it will appear as the description progresses that other substances will lend themselves readily to the purpose, I have found that a porous fibre board possessing flexural characteristics to be highly suitable for this purpose. Board of this nature is usually formed in flat sheets and in various thicknesses.

Studies of the application of acoustical material have shown that sound of low frequencies may be reduced by substances having either of the qualities or characteristics of resiliency or flexural yieldability. In my sound deadening or reducing construction, I utilize the second characteristics of acoustical material to absorb or reduce sound of low frequencies. In utilizing the fibrous board heretofore referred to, I make use of its vibratory response as a means for deadening or reducing sounds of low frequencies, and of its porosity or cellular structure for deadening or reducing sounds of high frequencies. By utilizing the same substances for acoustical treatment for both high and low frequencies I am enabled to use comparatively inexpensive material, thereby materially reducing costs for such treatment.

In carrying out my invention I utilize a hollow or dead-air-space type of construction, and to this end, in acoustical treatment, I provide a backing of porous or cellular material having sound absorbent characteristics, especially with regard to the higher frequencies. Spaced from the backing, I place a facing of the same material having a vibratory response acting to deaden sounds in the lower frequencies. Between the backing and facing I place walls of similar absorbent material, but situated with regard to the facing so as not to interfere with the flexural yielding of the facing. Sound in the higher frequencies readily passes through the facing and is absorbed by the backing and side walls, and the dead air which also has sound absorbent qualities, while sound in the lower frequencies causes a responsive vibration in the facing which, as is well known, acts to deaden such sound.

The objects of my invention concisely stated are:

The provision of sound deadening construction having substantially equal response to both high and low frequencies; the provision of sound deadening construction in which one type of substance or material is utilized for deadening of both high and low frequencies; the provision of sound deadening construction in which material having a porous or cellular structure is used for deadening sound of the high frequencies, and having a flexural yieldability providing a vibratory response for deadening sound in the lower frequencies; the provision of sound deadening construction with it is both easy and economical to apply.

Other and incidental objects of the invention will be ascertained upon reading the description following, aided by the drawing, wherein:

Figure 1 is a perspective of my invention and is therein shown as a prefabricated unit.

Figure 2 is a perspective of an oblong unit.

Figure 3 is a perspective end section indicated by section line 3—3 of Figure 2.

Figure 4 is an elevation of the unit shown in Figure 2 with parts broken away to show internal construction.

Figure 5 is an elevation of the unit shown in Figure 1 with parts broken away to show internal construction.

Figure 6 is a side sectional elevation of the unit shown in Figure 1.

Figure 7 is a side sectional elevation of a portion of the unit shown in Figure 2.

Figure 8 is a plan illustrating the placement of units upon a surface receiving acoustical treatment.

In the drawing, I have illustrated my invention as being in the form of prefabricated units. However, this is merely for convenience in installing my acoustical construction and describing the same, as it will be apparent as the description progresses that the element I hereafter term a backing may be first placed upon the surface to be acoustically treated and that thereafter the hereinafter described facing may be placed thereover, the two being held in proper relationship by suitable means. However, in a great number of instances pre-fabricated units will be especially adaptable for sound-absorbing treatment, and the description will therefore be directed thereto, though it is to be understood that the invention is not limited to prefabricated construction as heretofore noted.

My invention in its most general application consists of an inner member or plate backing or support member 1. This member is the base and support of a unit and is affixed or secured to the surface receiving acoustical treatment. Spaced above the backing 1 is an outer member or plate or facing 2. Facing 2 upon opposite edges has projecting side or edge members 3 which extend to and are secured to backing 1. Both backing 1 and facing 2 are formed of cellular or porous sound absorbent material, which material, of which there are a number suitable for this purpose, is manufactured in flat sheets. Likewise the edge members or spacers 3 are formed of the same material. The material utilized for this purpose preferably being characterized by flexural yieldability thus providing for a vibratory response in the facing 2 to sounds in the lower frequencies, and the thickness of member 2 is, of course, dominated by this requirement; that is, the thickness must be such as to permit such vibration. Projecting from the underside of facing 2 are a number of elongated ribs 4 which do not touch backing 1 even during the moments facing 2 vibrates. These ribs are of the same material used in the facing and backing. The ends of the units may be left open as shown in Figures 2, 3, 4, and 7, which allows the units to be placed end to end, thereby isolating the dead air chamber 5 from the exterior, or the ends may be closed with spacers 6 similar to previously described spacers 3. Spacers 3 and 6 may be separately constructed members properly secured to facing 2 and backing 1, or they may be integral with either the facing or the backing.

In practice, sound above a twelve hundred and forty frequency penetrates the facing 2 and enters the chamber 5, where the absorbent qualities of ribs 4, spacers 3 (and 6 where used) and backing 1 as well as the air in chamber 5 operate to deaden or absorb such sound. At the same time the sound frequencies below twelve hundred and forty cause a responsive vibration in the facing 2 (by reason of the flexural yieldability of the material employed) thus dampening or materially deadening the sound in such lower frequencies.

In the drawing two types or rather shapes of units are shown, one square and the other oblong. However, their construction is identical excepting that the square unit is provided with end spacers 6. The square units are smaller than the oblong, and for convenience in placing upon a surface to be acoustically treated. The smaller units may be a foot square. Figures 1, 5, 6, and 8 illustrate the smaller units. Figures 2, 3, 4, and 7 illustrate a somewhat larger unit. The larger units may be made in various sizes provided due regard be taken of the material used, its weakness, and so forth, in order to avoid structural weakness, sagging or bulging, or other defects liable to interfere with the operation of its sound absorbent qualities.

Figure 8 illustrates how the smaller units may be placed upon a surface to be treated. This may be done by cementing the backing in place, or by nails driven along the edges.

While the form of improvement herein shown and described is admirably adapted for fulfilling the objects primarily stated, it is to be understood that it is not intended to confine the invention to the one form of embodiment herein shown and described, as it is susceptible of embodiment in various forms, all coming within the scope of the claims which follow.

What I claim is:

1. A sound absorbing construction embodying a backing member, a facing member spaced therefrom, spacers along their edges securing backing and facing members in spaced relationship, said facing member, backing member and spacers being of a sound absorbent material, elongated ribs projecting from the inner side of the facing member into the space between the facing member and the backing member, and the thickness of said facing member permitting high frequency sound to penetrate into the space between it and the backing to be absorbed by said ribs, backing member and spacers, and the structure of the facing member providing it with a vibratorily absorbent response to sound in the lower frequencies.

2. Sound absorbent construction comprising a pair of flat members formed of sound absorbent porous material, said members being spaced from one another, means holding said members in such spaced relationship, said holding means being arranged along their corresponding edges, one of said members being a backing and the other a facing member, the facing member having a vibratory response in the presence of low frequency sound.

3. Sound absorbent construction characterized by an inner and an outer sheet spaced apart from one another to provide a sound absorbent space, said sheets being each of sound absorbent porous material, means securing the sheets in their relative positions, the outer sheet being sufficiently porous so that sound waves pass therethrough into the space between the sheets and to the inner sheet for absorption, and the structure of the outer sheet causing it to vibrate responsively to and absorb low frequency sound.

4. Sound absorbent construction comprising a sheet of sound absorbent porous material bodily flexible to vibrate in response to sound of low frequency and mounted in spaced relationship to a support to provide a space between it and such support so that it is free to so vibrate.

FRANCIS R. WOODBURY.